US012768591B2

(12) United States Patent
Blanchard et al.

(10) Patent No.: US 12,768,591 B2
(45) Date of Patent: Oct. 20, 2026

(54) DRYING INSTALLATION

(71) Applicant: SOLARONICS, Armentieres (FR)

(72) Inventors: Kevin Blanchard, Lille (FR); Nicolas Even, Vieille Chapelle (FR)

(73) Assignee: SOLARONICS, Armentieres (FR)

( * ) Notice: Subject to any disclaimer, the term of this patent is extended or adjusted under 35 U.S.C. 154(b) by 704 days.

(21) Appl. No.: 18/330,114

(22) Filed: Jun. 6, 2023

(65) Prior Publication Data

US 2023/0392864 A1 Dec. 7, 2023

(30) Foreign Application Priority Data

Jun. 6, 2022 (FR) .................................... 2205402

(51) Int. Cl.
*F26B 3/30* (2006.01)
*F26B 13/20* (2006.01)
*F26B 21/33* (2026.01)

(52) U.S. Cl.
CPC ............ *F26B 3/305* (2013.01); *F26B 13/104* (2013.01); *F26B 21/33* (2026.01)

(58) Field of Classification Search
CPC ......... F26B 3/305; F26B 21/33; F26B 13/104
USPC ........................................................ 34/267
See application file for complete search history.

(56) References Cited

U.S. PATENT DOCUMENTS 2,743,529 A 5/1956 Hayes
4,140,467 A * 2/1979 Ellison .................. F26B 23/022 110/204
5,718,062 A * 2/1998 de Vroome ........... F26B 23/022 34/538
6,321,462 B1 * 11/2001 Seidl ......................... F23G 7/07 34/423
6,913,457 B2 * 7/2005 Penfornis ................ F23C 6/045 431/8
7,275,929 B2 * 10/2007 Tiegs ...................... F24B 1/006 126/500
(Continued)

FOREIGN PATENT DOCUMENTS

CN 117190655 A * 12/2023 .............. F26B 21/33
EP 4290163 B1 * 10/2025 .............. F26B 21/33
(Continued)

*Primary Examiner* — Stephen M Gravini
(74) *Attorney, Agent, or Firm* — ROTHWELL, FIGG, ERNST & MANBECK, P.C.

(57) ABSTRACT

A drying installation for the continuous drying of a moving web material is provided. The installation includes radiating or heating elements, burning the gas. The installation includes a gas flow circulation system configured to suction combustion products generated by the radiating or heating elements. The gas flow circulation system also includes an extraction pipe configured for the evacuation from the installation of at least part of the combustion products suctioned by the gas flow circulation system. The installation also includes a device for treating carbon monoxide and optionally nitrogen oxides, the treatment device-including an oxidation and optionally reduction catalyst and being mounted on or downstream of said extraction pipe in order to treat the carbon monoxide and optionally the nitrogen oxides contained in the combustion products. The installation includes a regulation means configured to regulate the temperature of the catalyst at a temperature greater than or equal to 130° C.

20 Claims, 1 Drawing Sheet

(56) References Cited

U.S. PATENT DOCUMENTS

| | | | | |
|---|---|---|---|---|
| 7,603,793 | B2 * | 10/2009 | Hoshino | C04B 38/0016 428/116 |
| 8,186,076 | B2 * | 5/2012 | Takagi | B28B 11/241 219/749 |
| 9,221,027 | B2 * | 12/2015 | Kuppler | F27B 1/00 |
| 10,197,272 | B2 * | 2/2019 | Saratovsky | B01D 53/502 |
| 11,229,925 | B2 * | 1/2022 | Ayotte | B05D 3/0263 |
| 12,330,115 | B2 * | 6/2025 | Barnett | B01D 53/75 |
| 2003/0096208 | A1 * | 5/2003 | Bria | F26B 13/104 432/73 |
| 2023/0392864 | A1 * | 12/2023 | Blanchard | F26B 3/305 |

FOREIGN PATENT DOCUMENTS

| | | | | |
|---|---|---|---|---|
| FR | 3136275 | A1 * | 12/2023 | F26B 21/33 |
| IT | 102008901689918 | A1 | 6/2010 | |
| JP | 07204883 | A | 8/1995 | |
| JP | 2009101297 | A | 5/2009 | |
| WO | 2010073090 | A1 | 7/2010 | |
| WO | 2012073711 | A1 | 6/2012 | |

* cited by examiner

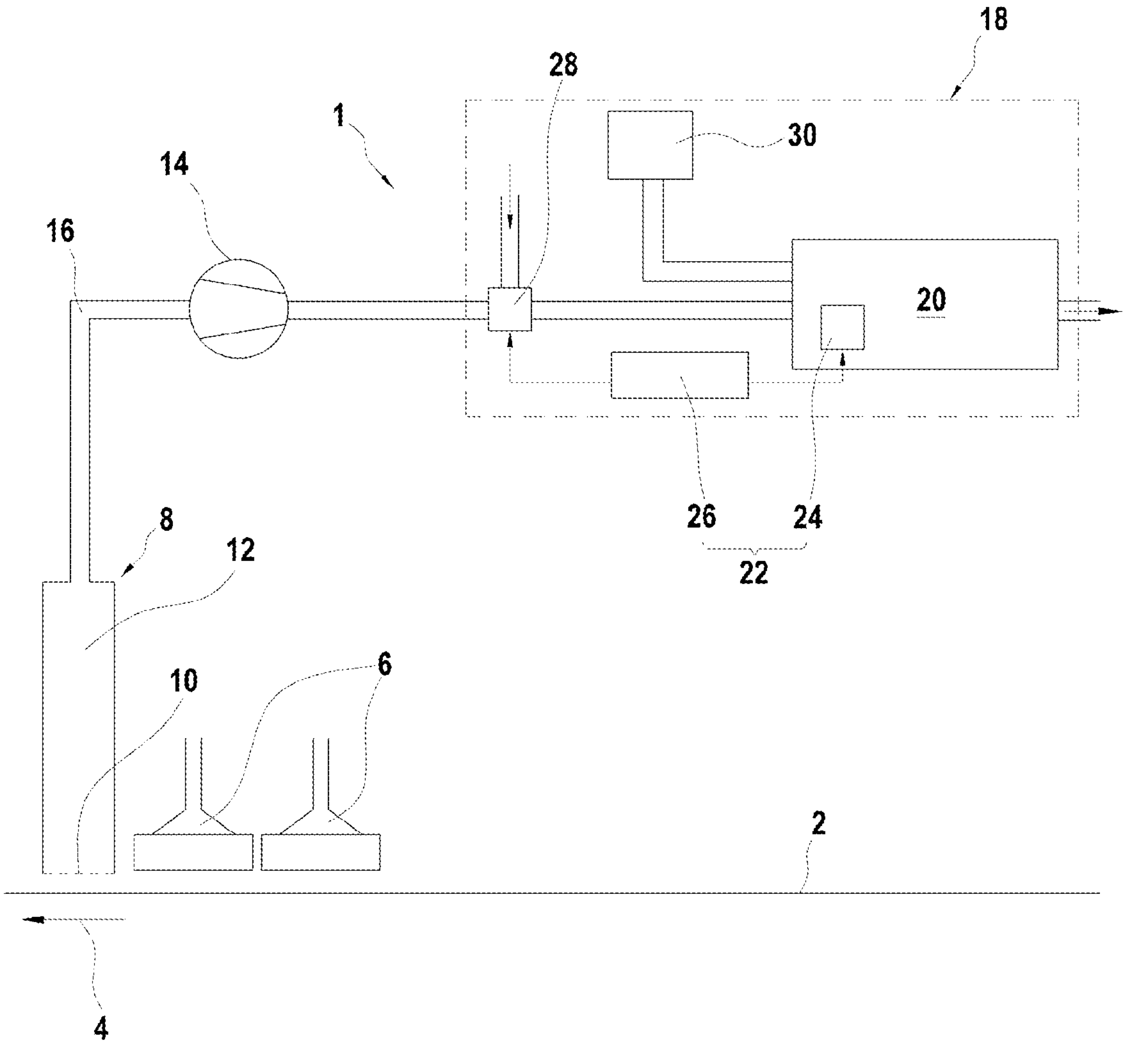
18
28
1
30
14
16
20
26
24
22
8
12
10
6
2
4

DRYING INSTALLATION

TECHNICAL FIELD

The present invention relates to an installation for drying a moving web material, in particular paper.

PRIOR ART

Depositions on continuous web material require heat treatment. The heat treatment must often be carried out without contact in order to preserve the quality of the surface state of the web material or of the deposition thereon. This applies, for example, to paper webs which have undergone wet treatment such as treatment to produce art paper. Systems for the continuous heat treatment of web material are known said systems combine infrared radiation and heating by convection. There are systems comprising infrared gas emitters, the hot gas of which is suctioned by means of suction nozzles and discharged onto the web by means of blowing nozzles, creating a combined system of heat treatment by radiation and convection.

Document U.S. Pat. No. 6,088,930 discloses a convection and radiation system for the heat treatment of a web which moves facing gas infrared radiant elements and elements blowing hot air on this web. The system comprises a succession of blowing elements separated from each other by at least one gas infrared radiating element. Each blowing element comprises on each side a suction element extending close to a gas infrared radiating element.

Document WO 2005/085729 describes a system causing reduced consumption of mechanical energy and reduced loss of thermal energy, reduced investment and operating costs, and requiring less space. This drying installation is characterized in that the suction, and optionally blowing, devices of the mass transfer system include at least one suction, and optionally blowing, device installed opposite the bandwidth with respect to corresponding suction and blowing ducts which extend at least in the transverse direction of the web, and arranged to suction and/or blow said combustion products in such a way as to optimize the vector averages. The vectors represent the respective trajectories of the various jets of combustion products suctioned and/or blown.

In this way, the heat transfers between the combustion products and the passage plane can be maximized, and it is also possible to obtain an extremely compact dryer installation in which the combustion products are blown at the highest possible temperature.

DISCLOSURE OF THE INVENTION

The present invention aims at improving the operation of the installations described above. In particular, the present invention aims at providing an installation for drying a moving web material, which is more respectful of the environment. More specifically, the present invention aims at providing an installation for drying a moving web material, having a lower ecological impact.

Thus, according to one aspect, provision is made of a drying installation intended for the continuous drying of a moving web material. The installation comprises:

- radiating or heating elements, burning a gas or gaseous mixture, for instance a premix of gas and air,
- a gas flow circulation system, or mass transfer system, for example with natural or forced convection, configured to suction combustion products generated by the radiating or heating elements.

The gas flow circulation system also includes an extraction pipe configured for the evacuation from the installation of at least part of the combustion products suctioned by the gas flow circulation system.

The installation also includes a device for treating the combustion products, the treatment device including an oxidation and/or reduction catalyst, and being mounted on or downstream of said extraction pipe in order to respectively treat the carbon monoxide and/or nitrogen oxides contained in the combustion products.

The catalyst may for example comprise a catalyst for the oxidation of carbon monoxide into carbon dioxide and/or a catalyst for the reduction of nitrogen oxides NOx into dinitrogen N2.

The treatment device allows to treat the gases discharged by the installation, so as to limit the amount of carbon monoxide and/or nitrogen oxides present therein.

The installation includes in particular a regulation means configured to regulate the temperature of the catalyst at a temperature greater than or equal to 130° C., preferably greater than or equal to 150° C., and more preferably greater than or equal to 200° C., or even 300° C. or 400° C.

Thus, the installation is configured to operate the treatment device under its optimum temperature conditions. More specifically, the installation is configured to operate the treatment device at a temperature allowing to obtain high efficiency, throughout the operation of the installation.

Preferably, the regulation means is configured to heat the catalyst to a temperature greater than or equal to 130° C., preferably greater than or equal to 150° C., and more preferably greater than or equal to 200° C., or even 300° C. or 400° C., and/or the regulation means is configured to maintain the catalyst at a temperature greater than or equal to 130° C., preferably greater than or equal to 150° C., and more preferably greater than or equal to 200° C., or even 300° C. or 400° C.

More specifically, the installation is configured to operate the catalyst under its optimum temperature conditions, so as to obtain high efficiency of the oxidation and/or reduction reaction, throughout the operation of the installation. Heating the catalyst to very high temperatures, in particular 300° C. or 400° C., can moreover allow to obtain, at the output of the treatment device, the same efficiency but with fewer precious metals in the catalyst than for a treatment device operating at a lower temperature.

Preferably, the regulation means includes a heating element, such as an electric element and/or a heat exchanger and/or an inductive means, configured to supply heat to the catalyst.

The electric or inductive heating means, for example a heating resistor or a coil, allows to obtain a rapid and controlled rise in the temperature of the catalyst. Such an electric or inductive heating means is particularly suitable during periods of transient operation of the installation, for example at start-up, during which the combustion products to be treated may have a temperature lower than that desired for the operation of the treatment device. In particular, the inductive heating means is particularly advantageous for concentrating, by choice of material and/or geometry, the transfer of energy at the points of the catalyst where the thermal energy will be most useful. Similarly, the heat exchanger can be used to reuse calories available elsewhere, in particular in the installation, to increase the temperature of the catalyst, while limiting the energy, in particular electric consumption, of the installation.

Preferably, the regulation means includes control means configured to control the radiating or heating elements, and/or the gas flow circulation system and/or the treatment device, in order to regulate the temperature of the catalyst.

The control means can in particular be configured to control valves, check valves, etc., in particular in the gas flow circulation system, or else the power supply, power, distribution, etc., of the radiating or heating elements.

Preferably, the regulation means includes at least one carbon monoxide and/or nitrogen oxide sensor mounted upstream or downstream of the catalyst and configured to respectively measure the amount of carbon monoxide and/or nitrogen oxides contained in the combustion products upstream and/or downstream of the catalyst. For example, the regulation means may comprise one carbon monoxide, and optionally nitrogen oxide sensor, mounted upstream of the catalyst, and one carbon monoxide, and optionally nitrogen oxide sensor, mounted downstream of the catalyst.

Carbon monoxide and nitrogen oxide sensors allow to determine the amounts of carbon monoxide and nitrogen oxides present in the combustion products to be treated and supplying the treatment device. Such sensors also allow to determine the effectiveness of the treatment device on the oxidation of carbon monoxide or the reduction of nitrogen oxides. For example, such sensors can allow to identify normal or abnormal wear of the treatment device, or else an anomaly or else a drift in the operation of the treatment device.

Preferably, the regulation means is configured to trigger an alert when the amount of carbon monoxide and/or nitrogen oxides contained in the combustion products downstream of the catalyst is greater than a defined threshold.

Preferably, the regulation means is configured to maintain the catalyst at a temperature greater than or equal to 130° C., preferably greater than or equal to 150° C., and more preferably greater than or equal to 200° C., or even 300° C. or 400° C., when the amount of carbon monoxide and/or nitrogen oxides contained in the combustion products upstream of the catalyst, is greater than a defined threshold.

In particular, if the amount of carbon monoxide and/or nitrogen oxides present in the combustion products to be treated is relatively low, in particular compared to one or more defined thresholds, the treatment device can be configured so as not to not regulate the temperature of the catalyst, in particular in order to avoid any useless energy expenditure.

Preferably, the installation comprises means for adding fresh air, for instance in the gas or gaseous mixture supplying the radiating or heating elements, and/or in the combustion products.

Preferably, the installation also comprises means for adding fresh air, configured in particular to modify the amount of fresh air present in the combustion products, and control means configured to control said means for adding air costs.

The addition of fresh air can take place upstream of the combustion, for example in the gas or gaseous mixture supplying the radiating or heating elements, or downstream of the combustion, for example in the combustion products formed by the radiating or heating elements. Thus, the means for adding fresh air can be a controlled valve modifying the composition of the gas, or gas mixture, supplying the radiating or heating elements, or else comprise a valve mounted in the extraction pipe and/or an cooling air inlet in the installation.

The means for adding fresh air can be controlled by the control means according to the temperature of the products of combustion, and/or according to the composition of the products of combustion.

For example, the installation may comprise means for adding fresh air to the gas, or gas mixture, supplying the radiating or heating elements, and control means controlling the amount of fresh air added to the gas supplying the radiating or heating elements, according to the temperature or to the composition of the combustion products entering the oxidation and optionally reduction catalyst.

Preferably, the installation also includes means for adding fresh air to the gas supplying the radiating or heating elements, and control means configured to reduce the amount of fresh air added to the gas supplying the radiating or heating elements, when the amount of carbon monoxide contained in the combustion products upstream of the catalyst, is below a defined threshold.

The amount of air in the gases supplying the radiating or heating elements is generally greater than that required by the stoichiometry of the combustion reaction, in order to ensure complete combustion. However, if the amount of carbon monoxide is low in the combustion products, this indicates that complete combustion is taking place: it is then possible to reduce the amount of fresh air supplying the radiating or heating elements, provided that the amount of carbon monoxide in the combustion products remains low.

Preferably, the regulation means comprises said control means. Alternatively, the control means may comprise manual control means.

Preferably, the regulation means is configured to regulate the temperature and/or composition of the combustion products entering the catalyst. For instance, the regulation means may be configured to heat the combustion products, in particular without modifying their composition. In other words, the combustion products are heated by the regulating means while having the same composition.

The installation can also control the temperature of the catalyst via the combustion products to be treated, by controlling the temperature thereof. Such regulation is particularly advantageous during continuous operation of the installation, when the temperature of the combustion products to be treated remains substantially constant over time and can therefore be modified at the regulation temperature desired for the treatment device. By regulating the temperature of the combustion products supplying the treatment device at the temperature desired for the operation of the catalyst, it then becomes possible to obtain the desired operation for the latter, with a substantially similar temperature.

Preferably, the installation also comprises means for determining the temperature of the catalyst, for example a temperature sensor mounted upstream of the catalyst, for example in the extraction pipe. The regulation means may comprise said means for determining the temperature of the catalyst.

Preferably, the installation also includes means for adding fresh air to the combustion products and/or to the gas supplying the radiating or heating elements, a temperature sensor mounted in the extraction pipe, upstream of the catalyst, and control means controlling the amount of fresh air added to the combustion products and/or to the gas supplying the radiating or heating elements.

In order to control the temperature of the combustion products supplying the catalyst, the installation may comprise a temperature sensor mounted upstream of the catalyst, and means for adding fresh air to the installation, in order to reduce the temperature of the gases supplying the catalyst. The addition of fresh air can thus be made in the combustion products supplying the catalyst, or else in the gases supplying the radiating or heating elements.

Preferably, the means for adding fresh air include a controlled valve mounted on the extraction pipe, and configured to adjust the amount of fresh air mixed with the combustion products.

The valve control adjusts the amount of fresh air added to the combustion products to change their temperature. The temperature of the combustion products is then adjusted just before they enter the catalyst.

Preferably, the means for adding fresh air include a cooling air inlet in the installation, preferably close to the radiating or heating elements.

Another possibility of modifying the fresh air content of the combustion products, and therefore the temperature of the combustion products, is the modification of the cooling air used in the installation, in particular near the radiating or heating elements. This amount of cooling air can also be adjusted in order to obtain the temperature desired for the combustion products entering the catalyst.

Preferably, the regulation means comprises said control means. Alternatively, the control means may comprise manual control means.

Preferably, the catalyst includes a metallic or ceramic support in the form of a honeycomb, with at least one portion coated with one or more precious metals and/or with a means for injecting a reducing agent, for example ammonia.

Such supports, well known to the person skilled in the art, allow to obtain very high active surfaces for a defined volume, which allows to obtain higher yields.

Preferably, the installation also comprises a device for unclogging the catalyst.

The unclogging device is intended to eliminate possible accumulations of residues within the catalyst and liable to block certain circulation channels of the gas to be treated. In order to maintain the efficiency of the catalyst, the unclogging device can be used at regular intervals or when the pressure drop through the catalyst exceeds a defined threshold, in order to regain its nominal performance.

Preferably, the device for unclogging the catalyst is a device for circulating a pressurized fluid, for example compressed air, through the catalyst.

In order to unclog the catalyst, it is possible to use compressed air. In particular, the sudden injection of compressed air into the inlet gases allows to create a sudden overpressure at the inlet of the catalyst which can break up the accumulations of residues and can evacuate them with the rest of the treated gases. A catalyst with a desired operation is then obtained.

BRIEF DESCRIPTION OF THE DRAWINGS

FIG. 1 shows a schematic view of a drying installation with a treatment device, according to the invention.

DESCRIPTION OF EMBODIMENTS

FIG. 1 schematically illustrates an example of a drying installation 1 for the continuous drying of a moving web material 2 according to the invention. The web material 2 moves in the direction indicated by the arrow 4 through the drying installation 1.

The exemplary drying installation 1 preferably comprises several gas radiation emitters 6 supplied with gas such as a premix of gas and air, installed along the line of movement of the web material 2, and a gas flow circulation system, or mass transfer system, 8 mounted downstream, in the direction of movement of the web material 2, of the emitters 6 and configured to allow the circulation of a gas flow, for example by natural or forced convection.

Conventionally, the gas flow circulation system 8 comprises suction nozzles 10 and an extraction pipe 12 to suction the hot air, or combustion products, at the moving web material 2. The extraction pipe 12 is provided for the evacuation from the drying installation 1 of the combustion products suctioned via a central fan 14 from the drying installation 1 and from one or more extraction pipes 16. The combustion products can thus be discharged outside, into the atmosphere, for example via a chimney, but can also, at least in part, be reused in another system. Thus, the combustion products leaving the treatment device as described below, can be rerouted in the drying installation itself, for example towards a heat exchanger, or else towards another installation, for example an air dryer.

The gas flow circulation system 8 can also comprise suction nozzles for the suction of hot gases from the moving web material towards a suction duct. The gas flow circulation system 8 can also comprise blow nozzles for blowing, for example, at least part of the hot gas suctioned into a blow pipe towards the moving web material, the blow pipe being in fluid communication with the suction pipe, in particular via a fan. Such suction nozzles, and optionally blowing nozzles, in combination with the corresponding pipes, allow to re-circulate the hot air present on the surface of the moving web material 2 during drying, so as to increase the proportion of water vapor in the air before it is evacuated from the installation 1.

In order to limit the impact of the gases emitted by the installation 1, the latter also includes a combustion product treatment device 18 mounted on the extraction pipe 16, for example downstream of the central fan 14. The treatment device 18 is intended to limit in particular the content of carbon monoxide and optionally nitrogen oxides present in the combustion products discharged by the installation 1, before their discharge into the open air.

For this purpose, the treatment device 18 may comprise an oxidation and optionally reduction catalyst 20, mounted on the extraction pipe 16 and allowing to react the carbon monoxide with an oxidizing compound, for example oxygen in the air, to transform it into carbon dioxide, and optionally to react the nitrogen oxides with a reducing compound, for example ammonia or urea injected into the catalyst 20. The catalyst 20 can thus be disposed, in a conventional manner, on a support having a high active or contact surface. The catalyst 20, present on the surface of the support, allows the implementation thereon of the reaction of oxidation of carbon monoxide into carbon dioxide and/or reduction of nitrogen oxides into dinitrogen. The support may in particular be a metal or ceramic support, and have a honeycomb geometry. The catalyst can itself comprise an oxidation catalyst with precious metals and/or a reduction catalyst associated with a means for injecting a reducing agent such as ammonia or urea. For example, the catalyst 20 can comprise a first portion with a reduction catalyst, associated with a means for injecting a reducing agent, and a second portion with an oxidation catalyst. Preferably, the catalyst includes a reduction catalyst, part of which is coated with precious metals to oxidize the carbon monoxide.

However, in order to allow high efficiency of the catalyst 20 during the various operating phases of the drying installation 1, the treatment device 18 also comprises means 22 for regulating the temperature of the catalyst 20. The regulation means 22 is configured to allow the catalyst 20 to be in its range of nominal operating temperatures, for example at a temperature greater than or equal to 130° C., preferably greater than or equal to 150° C., and more preferably greater than or equal to 200° C. Alternatively, or in addition, the regulation means 22 can be configured to allow the catalyst 20 to be at a temperature greater than or equal to 300° C., or even 400° C., so as to increase its efficiency or so as to obtain a similar efficiency with a catalyst less rich in precious metal but operating at a lower temperature.

To this end, the regulation means 22 can be configured to allow a rapid modification of the temperature of the catalyst 20 when the latter is outside of said nominal temperature range, and/or else to allow maintaining the temperature of the catalyst 20 when the latter is within said nominal temperature range.

For example, the regulation means 22 can be configured to heat the catalyst 20 to a temperature greater than or equal to 130° C., preferably greater than or equal to 150° C., and more preferably greater than or equal to 200° C. or even 300° C. or 400° C., and/or to maintain the oxidation catalyst at a temperature greater than or equal to 130° C., preferably greater than or equal to 150° C., and more preferably greater than or equal to 200° C., or even 300° C. or 400° C.

Thus, the regulation means 22 can comprise a heating element 24, such as an electric element and/or a heat exchanger, for example mounted within or in contact with the catalyst support 20, in order to heat the latter when its temperature is too low, in particular during the start-up phases of the installation 1. The heating element 24 is thus used temporarily, in order to bring the catalyst into its nominal operating conditions until it can remain therein independently. Moreover, the heat exchanger can be advantageously used to recover the calories released elsewhere in the installation and to supply them to the catalyst in order to heat it without thereby increasing the energy consumption of the installation.

The regulation means 22 can also regulate the temperature of the combustion products supplying the catalyst 20, so that they have a temperature comprised in the range of nominal temperatures of the catalyst 20, so as to put or maintain the catalyst 20 in its range of nominal temperatures.

In order to modify the temperature of the combustion products routed by the extraction pipe 16 and supplying the catalyst 20, the regulation means 22 may comprise a control means 26 configured to add fresh air to the combustion products, either before the combustion of the gas by the emitters 6, or between the combustion and the suction by the gas flow circulation system 8, or after the suction by the gas flow circulation system 8.

Thus, the control means 26 can increase or decrease the amount of fresh air mixed with the gas supplying the emitters 6, before their combustion, so as to obtain less or more hot combustion products. Similarly, when the amount of carbon monoxide in the combustion products supplying the treatment device 18 is less than a defined threshold, the control means 26 can also reduce the amount of fresh air supplying the emitters 6, since the combustion is already complete.

Alternatively, or in addition, the control means 26 can increase or decrease the amount of fresh cooling air introduced into the installation 1 between the gas emitters 6 and the gas flow circulation system 8. Such cooling air, by mixing with the combustion products before the suction by the gas flow circulation system 8, allows to obtain a modification of the temperature of the gases routed by the extraction pipe 16 to the catalyst 20.

Finally, alternatively or in addition to the embodiments described above, the control means 26 can also be configured to add fresh air or not to the combustion products, at the extraction pipe 16 supplying the catalyst 20. For example, the treatment device 18 may comprise a controlled valve 28 for adding fresh air which is mounted on the extraction pipe 16, upstream of the catalyst 20. The controlled valve 28 is connected to a fresh air inlet and allows, according to the control given by the control means 26, to add or not, or to modify an amount of fresh air added to the combustion products, so as to change the temperature thereof.

In order to determine the control of the controlled valve, or of the fresh air supplies of the emitters 6 or of the cooling means of the installation 1, the treatment device 18 may include one or more temperature sensors, one or more carbon monoxide sensors and/or one or more nitrogen oxide sensors (not shown), mounted at different points of the installation 1, for example upstream, on or downstream of the catalyst 20 but also at the extraction pipe 16. The control means 26 can then determine a control from the information supplied by this or these sensors.

The control means 26 can also directly control the power of the radiating or heating elements 2, for example individually or else globally. Thus, the control means 26 can regulate the temperature of the catalyst by modifying the power or the number of the radiating or heating elements 6 operating in the installation 1, or else the distribution of the radiating or heating elements 6 operating in the installation 1. Likewise, the frequency or the circulation paths of the gas flows in the circulation system 8 can be modified by the control means in order to obtain the temperature desired for the combustion products entering the catalyst 20.

Finally, and in order to limit the phenomena of clogging of the catalyst 20, in particular of the channels of the support, the treatment device 18 can comprise an unclogging device 30. The unclogging device 30 can for example be a device for circulating a pressurized fluid, for example compressed air, through the catalyst and be mounted upstream or downstream of the catalyst 20. By creating a significant pressure difference between the inlet and the outlet of the catalyst 20, the unclogging device 30 can then reduce or break the plugs likely to have formed in the channels of the support, and evacuate them outside the catalyst 20.

The use of the unclogging device 30 can in particular be controlled according to the operating time of the catalyst 20, for example with an unclogging procedure provided for every 20, 30 or 50 hours of operation of the catalyst 20. Alternatively, the unclogging 30 can be controlled according to the evolution of the pressure drop between the inlet and the outlet of the catalyst 20, for example when such a pressure drop exceeds a defined threshold or else increases, for a defined time, by a defined value.

Thus, thanks to the invention, it becomes possible to treat effectively and over the long term, the combustion products discharged by a drying installation of a moving web material. In particular, the treatment device is configured to operate as long as possible in its nominal area, including during transient periods, in particular start-up. Likewise, prolonged operation is ensured thanks to the unclogging device which allows to maintain the catalyst's capacity to treat the combustion products routed by the extraction pipe.

The invention claimed is:

1. A drying installation intended for continuous drying of a moving web material, the installation comprising:

radiating or heating elements configured to burn a gas or gaseous mixture;

a gas flow circulation system configured to suction combustion products generated by the radiating or heating elements, wherein the gas flow circulation system also includes an extraction pipe configured for evacuation from the installation of at least part of the combustion products suctioned by the gas flow circulation system, wherein the installation also includes a device for treating the combustion products, the device including an oxidation catalyst for oxidizing carbon monoxide and being mounted on or downstream of said extraction pipe in order to treat carbon monoxide contained in the combustion products, and wherein the installation also includes a regulation means configured to regulate a temperature of the oxidation catalyst at a temperature greater than or equal to 130° C.

2. The installation according to claim 1, wherein the regulation means is configured to heat the oxidation catalyst to a temperature greater than or equal to 130° C. and/or wherein the regulation means is configured to maintain the oxidation catalyst at a temperature greater than or equal to 130° C.

3. The installation according to claim 1, wherein the regulation means includes at least one electric element and/or at least one heat exchanger, configured to supply heat to the oxidation catalyst.

4. The installation according to claim 1, wherein the regulation means includes at least one carbon monoxide sensor mounted upstream and/or downstream of the oxidation catalyst and configured to measure an amount of carbon monoxide contained in the combustion products upstream and/or downstream of the oxidation catalyst.

5. The installation according to claim 4, wherein the regulation means is configured to maintain the oxidation catalyst at a temperature greater than or equal to 130° C. when the amount of carbon monoxide contained in the combustion products upstream of the oxidation catalyst is greater than a defined threshold.

6. The installation according to claim 4, wherein the installation also includes means for adding fresh air to the gas or gaseous mixture supplying the radiating or heating elements, and wherein the regulation means includes control means configured to reduce an amount of fresh air added to the gas or gaseous mixture supplying the radiating or heating elements when the amount of carbon monoxide contained in the combustion products upstream of the oxidation catalyst is below a defined threshold.

7. The installation according to claim 1, wherein the regulation means is configured to regulate the temperature of the combustion products entering the oxidation catalyst.

8. The installation according to claim 7, wherein the installation also includes means for adding fresh air to the combustion products and/or to the gas or gaseous mixture supplying the radiating or heating elements, and wherein the regulation means includes a temperature sensor mounted in the extraction pipe, upstream of the oxidation catalyst, and control means configured to control an amount of fresh air added to the combustion products and/or to the gas or gaseous mixture supplying the radiating or heating elements.

9. The installation according to claim 8, wherein the means for adding fresh air include a controlled valve mounted on the extraction pipe and configured to adjust the amount of fresh air mixed with the combustion products.

10. The installation according to claim 8, wherein the means for adding fresh air include a cooling air inlet in the installation.

11. The installation according to claim 1, wherein the oxidation catalyst includes a metallic or ceramic support in the form of a honeycomb, with at least one portion coated with one or more precious metals.

12. The installation according to claim 1, also including a device for unclogging the oxidation catalyst.

13. The installation according to claim 12, wherein the device for unclogging the oxidation catalyst is a device for circulating a pressurized fluid through the oxidation catalyst.

14. The installation according to claim 1, wherein the device for treating the combustion products is also includes a reduction catalyst configured to reduce nitrogen oxides contained in the combustion products.

15. The installation according to claim 14, wherein the regulation means also includes at least one nitrogen oxide sensor, mounted upstream and/or downstream of the reduction catalyst and configured to measure an amount of nitrogen oxides contained in the combustion products upstream and/or downstream of the reduction catalyst.

16. The installation according to claim 15, wherein the regulation means is also configured to maintain the reduction catalyst at a temperature greater than or equal to 130° C. when an amount of nitrogen oxides, contained in the combustion products upstream of the reduction catalyst is greater than a defined threshold.

17. The installation according to claim 10, wherein the cooling air inlet is close to the radiating or heating elements.

18. The installation according to claim 14, wherein the reduction catalyst includes an injector configured to inject a reducing agent.

19. The installation according to claim 18, wherein the reducing agent is ammonia.

20. The installation according to claim 13, wherein the device for unclogging the oxidation catalyst is a device for circulating compressed air through the oxidation catalyst.

* * * * *